United States Patent
Hsiao et al.

(10) Patent No.: US 10,698,617 B2
(45) Date of Patent: Jun. 30, 2020

(54) MEMORY SYSTEM

(71) Applicant: Toshiba Memory Corporation, Minato-ku (JP)

(72) Inventors: Paiching Hsiao, Yokohama (JP); Nobuhiro Ono, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/294,127

(22) Filed: Mar. 6, 2019

(65) Prior Publication Data

US 2019/0369888 A1    Dec. 5, 2019

(30) Foreign Application Priority Data

May 31, 2018 (JP) .................. 2018-105275

(51) Int. Cl.
*G06F 12/10* (2016.01)
*G06F 3/06* (2006.01)
*G06F 12/02* (2006.01)
*G06F 9/4401* (2018.01)

(52) U.S. Cl.
CPC .......... *G06F 3/0629* (2013.01); *G06F 3/0619* (2013.01); *G06F 3/0652* (2013.01); *G06F 3/0683* (2013.01); *G06F 9/4401* (2013.01); *G06F 12/0246* (2013.01)

(58) Field of Classification Search
CPC ............................ G06F 3/0629; G06F 12/0246
USPC ......................................................... 711/154
See application file for complete search history.

(56) References Cited

U.S. PATENT DOCUMENTS

| | | | |
|---|---|---|---|
| 6,101,608 A * | 8/2000 | Schmidt | H04L 12/12 726/2 |
| 7,055,029 B2 * | 5/2006 | Collins | G06F 21/572 380/262 |
| 8,452,913 B2 | 5/2013 | Sudo | |
| 10,089,031 B2 | 10/2018 | Seo et al. | |
| 2002/0126539 A1 * | 9/2002 | Roohparvar | G11C 8/12 365/185.33 |
| 2012/0284453 A1 | 11/2012 | Hashimoto | |
| 2018/0285562 A1 | 10/2018 | Radhakrishnan et al. | |

FOREIGN PATENT DOCUMENTS

| | | |
|---|---|---|
| JP | 5002719 | 8/2012 |
| TW | I459199 B | 11/2014 |

* cited by examiner

*Primary Examiner* — Jae U Yu
(74) *Attorney, Agent, or Firm* — Oblon, McClelland, Maier & Neustadt, L.L.P.

(57) ABSTRACT

According to one embodiment, a memory system includes: a non-volatile memory including a first area configured to hold first data received from an outside and a second area configured to hold second data; a volatile memory; and a controller. The non-volatile memory holds third data that associates a first address of the first data assigned to an instruction received from an outside with a second address of the first data that specifies a part of the first area. As a startup operation, the controller reads the third data from the non-volatile memory and holds the third data as fourth data in the volatile memory. The controller erases the fourth data from the volatile memory when the second data is held in the second area.

9 Claims, 8 Drawing Sheets

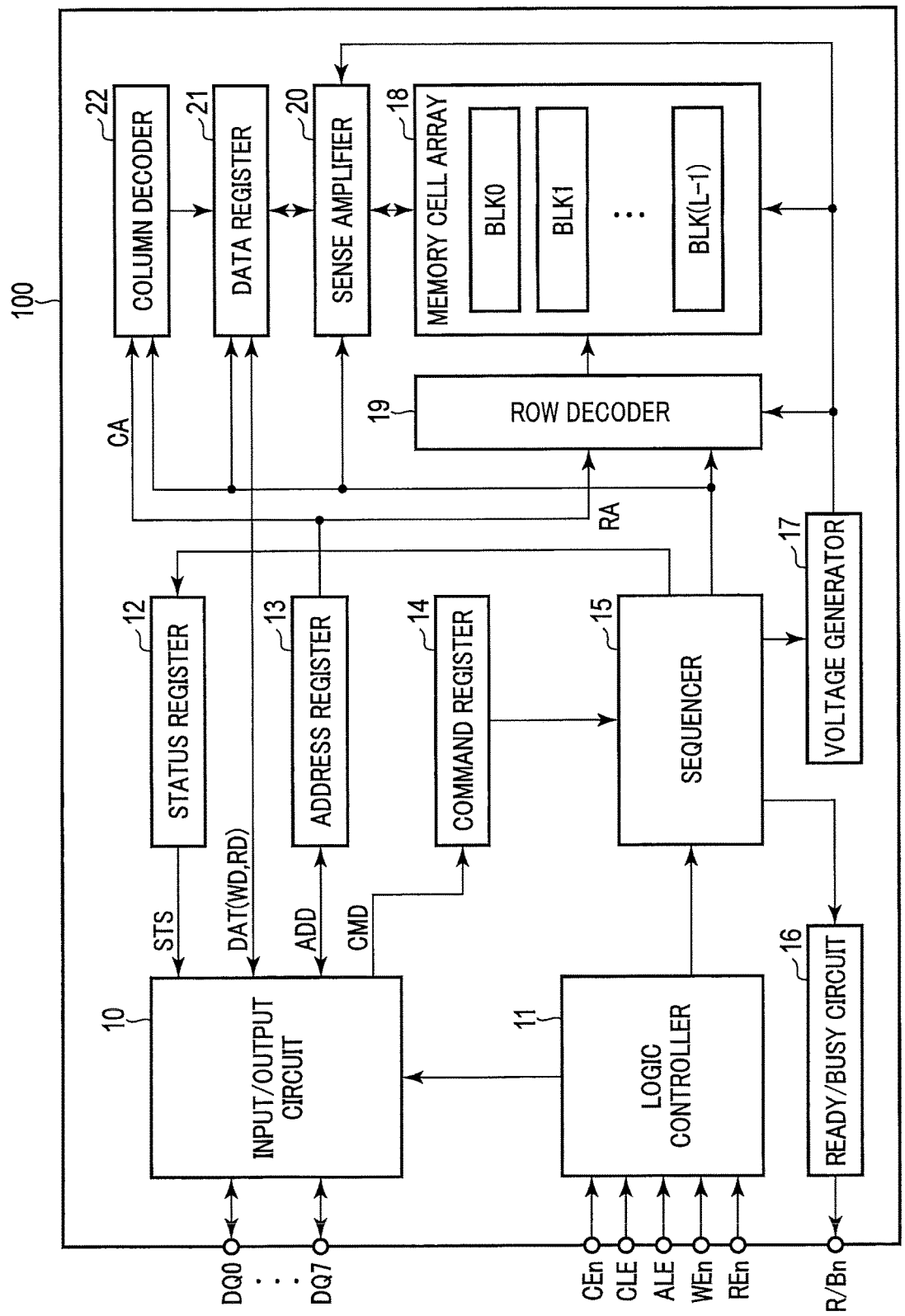
F I G. 2

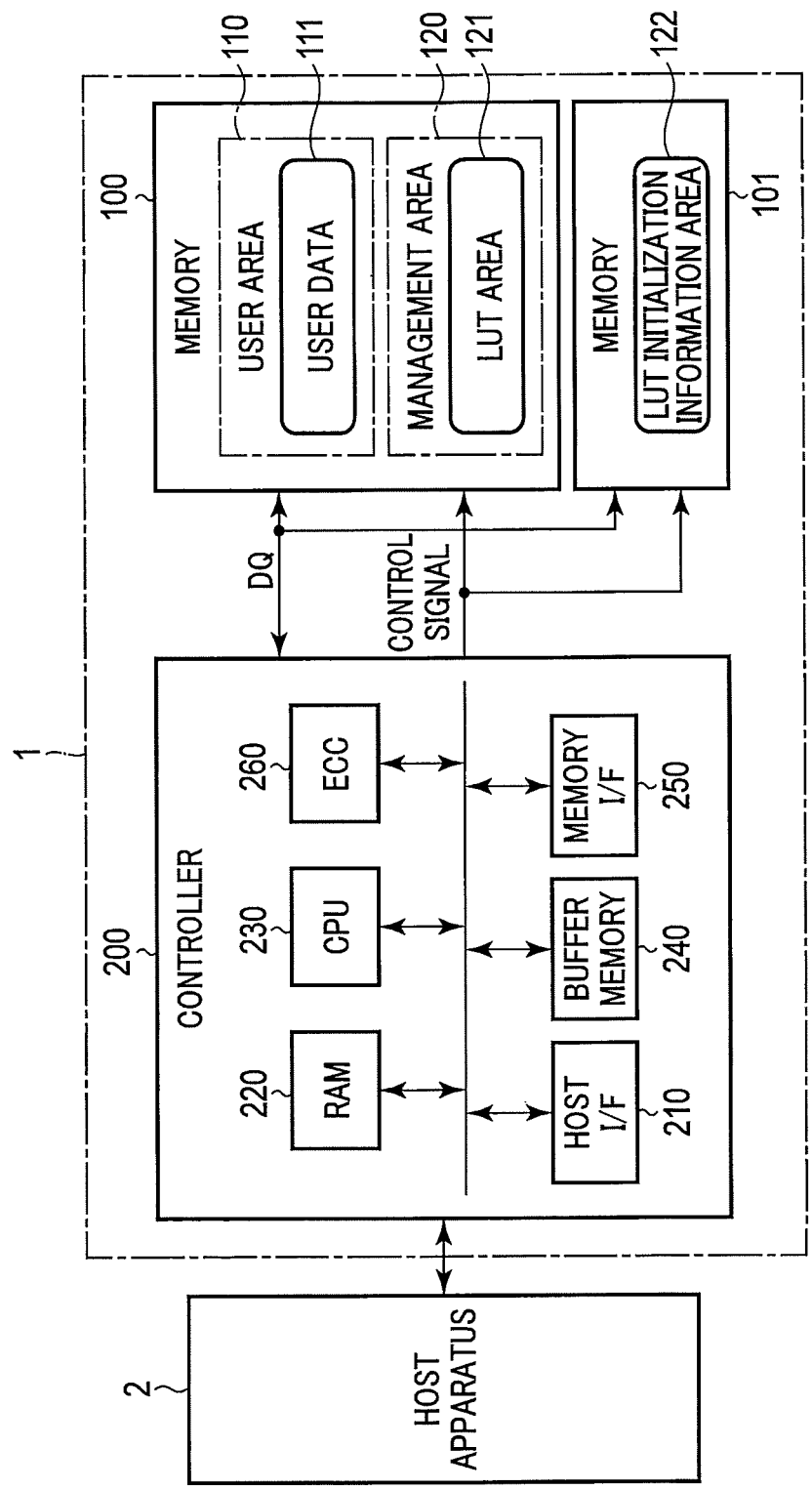
F I G. 8

MEMORY SYSTEM

CROSS-REFERENCE TO RELATED APPLICATIONS

This application is based upon and claims the benefit of priority from Japanese Patent Application No. 2018-105275, filed May 31, 2018, the entire contents of which are incorporated herein by reference.

FIELD

Embodiments described herein relate generally to a memory system.

BACKGROUND

A memory system that uses a NAND-type flash memory as a semiconductor storage device is known.

BRIEF DESCRIPTION OF THE DRAWINGS

FIG. 2 is a block diagram of a memory included in a memory system according to the first embodiment;

FIG. 8 is a block diagram of a memory system according to a third embodiment.

DETAILED DESCRIPTION

In general, according to one embodiment, a memory system includes: a non-volatile memory including a first area configured to hold first data received from an outside and a second area configured to hold second data; a volatile memory; and a controller configured to control the non-volatile memory and the volatile memory. The non-volatile memory holds third data that associates a first address of the first data assigned to an instruction received from an outside with a second address of the first data that specifies a part of the first area. As a startup operation, the controller reads the third data from the non-volatile memory and holds the third data as fourth data in the volatile memory. The controller erases the fourth data from the volatile memory when the second data is held in the second area.

1. First Embodiment

Figure 1:
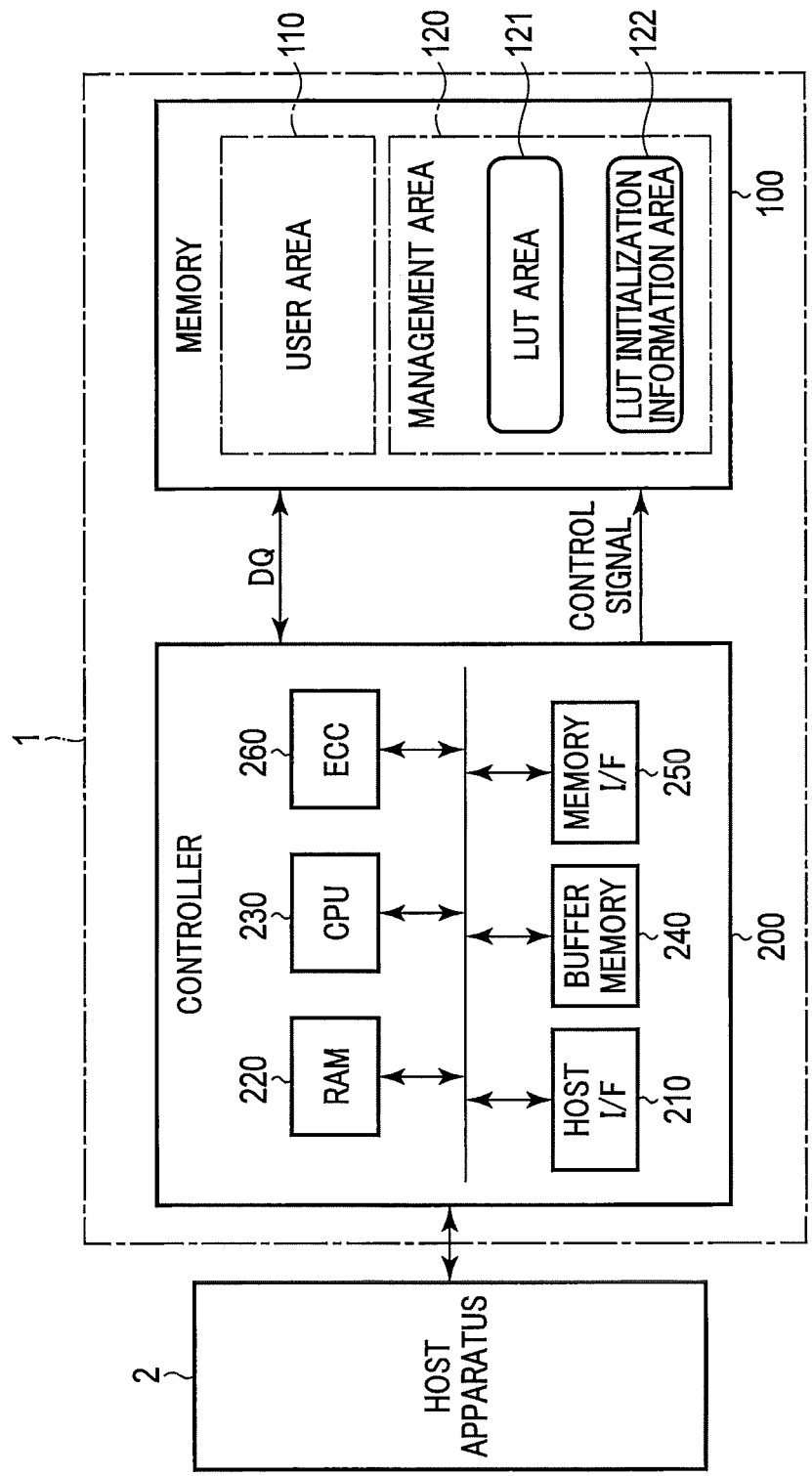
FIG. 1 is a block diagram showing a memory system according to a first embodiment.

A memory system according to a first embodiment will be explained. In the description that follows, an explanation will be made about the case where a NAND-type flash memory is used as a semiconductor storage device. In FIG. 1, a part of coupling between the blocks is represented by directional lines; however, the coupling between the blocks is not limited thereto.

1.1. Configuration

1.1.1. Overall Configuration of Memory System

First, the overall configuration of the memory system will be explained with reference to FIG. 1.

As shown in FIG. 1, the memory system 1 comprises a non-volatile semiconductor memory (hereinafter referred to as "memory") 100 and a controller 200. The controller 200 and the memory 100, in combination, for example, may form a single semiconductor storage device, and examples of such a semiconductor storage device include a memory card, such as an SD™ card, a solid-state drive (SSD), etc.

The controller 200 manages the memory space of the memory 100. Also, the controller 200 instructs the memory 100 to perform a user data read operation, a user data write operation, a user data erase operation, etc., in response to an instruction (request) from a host apparatus 2.

More specifically, upon receiving a read instruction from the host apparatus 2, for example, the controller 200 reads, from the memory 100, a table (hereinafter referred to as "lookup table LUT") in which data (hereinafter referred to as "logical-to-physical address conversion data") that associates a logical address with a physical address, or a part of the lookup table LUT corresponding to a logical address of a read target. A logical address is assigned to user data to which an access (a read operation, a write operation, an erase operation, etc.) is requested by the host apparatus 2. A physical address specifies at least a part of the memory space of the memory 100. Using the read lookup table LUT, the controller 200 converts a logical address into a physical address, and then transmits a read instruction to the memory 100.

When a write instruction is received from the host apparatus 2, the controller 200 updates the lookup table LUT (a second lookup table LUT) in the controller 200, newly assigns a physical address corresponding to the logical address, and transmits a write instruction to the memory 100. The controller 200 updates the lookup table LUT (a first lookup table LUT) in the memory 100 at a freely-selected timing.

An erase instruction that the controller 200 receives from the host apparatus 2 can be roughly divided into two modes. The first mode is a logical-to-physical address conversion data erasure instruction, which is to erase the logical-to-physical address conversion data corresponding to the logical address of the erase target (hereinafter referred to as "logical-to-physical address conversion data erasure"), thus inhibiting the user data in the memory 100 from being read on the system. In the case of the logical-to-physical address conversion data erasure, the user data remains in the memory 100. The second mode is an instruction to physically erase the user data in the memory 100 (hereinafter referred to as "physical erasure"), in addition to the logical-to-physical address conversion data. In the case of the physical erasure, the user data in the memory 100 is also erased.

The controller 200 includes a host interface circuit 210, an embedded memory (RAM) 220, a processor (CPU) 230, a buffer memory 240, a memory interface circuit 250, and an ECC circuit 260.

The host interface circuit 210 is coupled to the host apparatus 2 via a controller bus, and manages communication with the host apparatus 2. The host interface circuit 210 transfers user data and an instruction received from the host apparatus 2 to the CPU 230 and the buffer memory 240. In response to an instruction from the CPU 230, the host interface circuit 210 transfers the user data in the buffer memory 240 to the host apparatus 2.

The memory interface circuit 250 is coupled to the memory 100 via a bus, and manages communication with the memory 100. The memory interface circuit 250 transmits an instruction (control signal) from the CPU 230 in a format that can be recognized by the memory 100. Also, the memory interface circuit 250 transmits and receives a signal DQ to and from the memory 100. The signal DQ includes, for example, data, an address, and a command. More specifically, in a write operation, the memory interface circuit 250 transfers write data in the buffer memory 240 to the memory 100. In a read operation, the memory interface circuit 250 transfers data read from the memory 100 to the buffer memory 240.

The CPU 230 controls the operations of the entire controller 200. The CPU 230 issues various commands in response to instructions from the host apparatus 2, and transmits the commands to the memory 100. For example, when a write instruction is received from the host apparatus 2, the CPU 230 transmits the write instruction (write command) to the memory 100 in response thereto. In the case of a read operation and an erase operation, the CPU 230 similarly transmits, in response to instructions received from the host apparatus 2, various instructions to the memory 100. The CPU 230 performs various processes to manage the memory 100, such as wear leveling. The CPU 230 also performs various computations.

The CPU 230 also converts, based on logical-to-physical address conversion data, a logical address into a physical address, and vice versa. The CPU 230 manages the lookup table LUT, and stores and erases the logical-to-physical address conversion data into and from the lookup table LUT.

The ECC circuit 260 subjects data to an error checking and correcting (ECC) process.

The RAM 220 is a volatile semiconductor memory such as DRAM, and is used as a work area of the CPU 230. The RAM 220 holds firmware for managing the memory 100, various management tables, etc. The RAM 220 temporarily holds the second lookup table LUT read from the memory 100. The RAM may be provided outside the controller 200.

The buffer memory 240 holds data (write data) to be written into the memory 100, data (read data) read from the memory 100, etc.

The memory 100 performs a data write operation and a data read operation in certain write units, consisting of a plurality of bits. Also, the memory 100 erases data in erase units, consisting of a plurality of write units. For example, the memory 100 is formed of one or more non-volatile memories. In the present embodiment, a case will be explained where the memory 100 is formed of a single NAND-type flash memory. The memory 100 may be formed of a plurality of NAND-type flash memories, and may be formed of other types of non-volatile memories. The NAND-type flash memory may be a three-dimensionally stacked NAND-type flash memory, in which memory cell transistors are three-dimensionally stacked above the semiconductor substrate, and may be a planar NAND-type flash memory, in which memory cell transistors are two-dimensionally arranged above the semiconductor substrate. The configuration of the memory 100 will be described later in detail.

The memory 100 roughly includes, as a spatial area of the memory, a user area 110 and a management area 120.

The user area 110 is an area used in a user data write operation and a user data read operation received from the host apparatus 2.

The management area 120 is an area in which a control program in the memory 100, a first lookup table LUT, or management data that forms the basis of the memory system 1, such as various configuration parameters, are stored. The management area 120 includes a LUT area 121 and a LUT initialization information area 122.

The LUT area is an area in which the first lookup table LUT is stored.

The LUT initialization information area 122 is an area in which, when the second lookup table LUT stored in the RAM 220 is initialized by, for example, an erase operation (logical erasure), information (hereinafter referred to as "LUT initialization information") indicating the initialization of the second lookup table LUT is stored. The LUT initialization information is data of a relatively small size, e.g., a few bytes.

For example, when a problem arises in the memory 100, or when the number of write/erase cycles reaches a predetermined number, the memory system 1 may shift to a mode (hereinafter referred to as "read-only mode") that allows a read operation to be performed, while restricting a write operation and an erase operation to and from the memory 100. When a shift is made to the read-only mode, for example, the user may remove the memory 100 for exchange, inspection, etc. At this time, the user may erase the entire user data in the memory 100 for secrecy protection, and may invalidate the memory 100 (hereinafter referred to as "sanitization"). However, in the read-only mode, non-volatilization of data of a relatively large size (e.g., user data, first lookup table LUT, etc.), namely, a write operation and an erase operation, cannot be performed. Accordingly, in the present embodiment, when the memory 100 is sanitized in the read-only mode, the second lookup table LUT stored in the RAM 220 is initialized, and the LUT initialization information, which is data of a relatively small size, is stored in the memory 100. In power cycling in which the power is repeatedly turned on and off, logical erasure, namely, initialization of the first lookup table LUT, is performed based on the LUT initialization information whenever the power is turned on, thus maintaining the state in which the user data is erased.

1.1.2. Configuration of Memory

Next, the configuration of the memory 100 will be explained with reference to FIG. 2. In FIG. 2, a part of coupling between the blocks is represented by directional lines; however, the coupling between the blocks is not limited thereto.

As shown in FIG. 2, the memory 100 (NAND-type flash memory) includes an input/output circuit 10, a logic controller 11, a status register 12, an address register 13, a command register 14, a sequencer 15, a ready/busy circuit 16, a voltage generator 17, a memory cell array 18, a row decoder 19, a sense amplifier 20, a data register 21, and a column decoder 22.

The input/output circuit 10 controls input and output of a signal DQ to and from the controller 200. In the example of FIG. 2, eight-bit signals DQ0 to DQ7 are input and output. The input/output circuit 10 transmits data DAT (write data WD) received from the controller 200 to the data register 21, transmits an address ADD to the address register 13, and transmits a command CMD to the command register 14. The input/output circuit 10 transmits, to the controller 200, status information STS received from the status register 12, data DAT (read data RD) received from the data register 21, and the address ADD received from the address register 13.

The logic controller 11 receives, from the controller 200, a chip enable signal CEn, a command latch enable signal CLE, an address latch enable signal ALE, a write enable signal WEn, and a read enable signal REn, for example, as control signals. In accordance with the received signal, the logic controller 11 controls the input/output circuit 10 and the sequencer 15.

The chip enable signal CEn is a signal for enabling the NAND-type flash memory. The command latch enable signal CLE is a signal indicating that the signal DQ is a command. The address latch enable signal ALE is a signal indicating that the signal DQ is an address. The write enable signal WEn is a signal for taking a received signal into the NAND-type flash memory. The read enable signal REn is a signal for allowing the controller 200 to read data from the NAND-type flash memory.

The status register 12 temporarily holds status information STS in a data write operation, a data read operation, a data erase operation, etc., and notifies the controller 200 whether or not the operation has been properly completed.

The address register 13 temporarily holds an address ADD received from the controller 200 via the input/output circuit 10. The address register 13 transfers a row address RA to the row decoder 19, and transfers a column address CA to the column decoder 22.

The command register 14 temporarily stores the command CMD received from the controller 200 via the input/output circuit 10, and transfers the command CMD to the sequencer 15.

The sequencer 15 controls the operation of the entire NAND-type flash memory. More specifically, the sequencer 15 controls, for example, the status register 12, the ready/busy circuit 16, the voltage generator 17, the row decoder 19, the sense amplifier 20, the data register 21, and the column decoder 22 in response to the command CMD held in the command register 14, and performs a write operation, a read operation, an erase operation, etc.

The ready/busy circuit 16 transmits a ready/busy signal R/Bn to the controller 200 in accordance with the operation situation of the sequencer 15. The ready/busy signal R/Bn is a signal indicating whether or not the NAND-type flash memory is in a busy state or a ready state (whether or not a command can be received from the controller 200).

In accordance with the control by the sequencer 15, the voltage generator 17 generates a voltage necessary for a write operation, a read operation, and an erase operation, and supplies the generated voltages to, for example, the memory cell array 18, the row decoder 19, the sense amplifier 20, etc. The row decoder 19 and the sense amplifier 20 apply voltages supplied from the voltage generator 17 to memory cell transistors in the memory cell array 18.

The memory cell array 18 includes a plurality of blocks BLK (BLK0, BLK1, . . . , and BLK (L−1)) (where L is an integer of two or greater), each including non-volatile memory cell transistors (hereinafter also referred to as "memory cells") associated with rows and columns. Each of the blocks BLK includes a plurality of string units SU (SU0, SU1, SU2, SU3, . . . ). Each of the string units SU includes a plurality of NAND strings SR. The number of blocks BLK in the memory cell array 18 and the number of string units SU in each block BLK may be freely selected. The memory cell array 18 will be described later in detail.

The row decoder 19 decodes a row address RA. Based on the decoded result, the row decoder 19 selects one of the blocks BLK, and also selects one of the string units SU. The row decoder 19 applies a necessary voltage to the selected block BLK.

In a read operation, the sense amplifier 20 senses data read from the memory cell array 18. The sense amplifier 20 transmits the read data RD to the data register 21. In a write operation, the sense amplifier 20 transmits write data WD to the memory cell array 18.

The data register 21 includes a plurality of latch circuits. The latch circuits hold the write data WD and the read data RD. For example, in a write operation, the data register 21 temporarily holds the write data WD received from the input/output circuit 10, and transmits the write data WD to the sense amplifier 20. In a read operation, for example, the data register 21 temporarily holds the read data RD received from the sense amplifier 20, and transmits the read data RD to the input/output circuit 10.

In a write operation, a read operation, and an erase operation, the column decoder 22 decodes a column address CA, and selects a latch circuit in the data register 21 in accordance with the decoded result.

1.1.3. Configuration of Memory Cell Array

Next, the configuration of the memory cell array 18 will be explained with reference to FIG. 3. The example in FIG. 3 shows a configuration of a block BLK0; however, the other blocks BLK have the same configuration.

Figure 3:
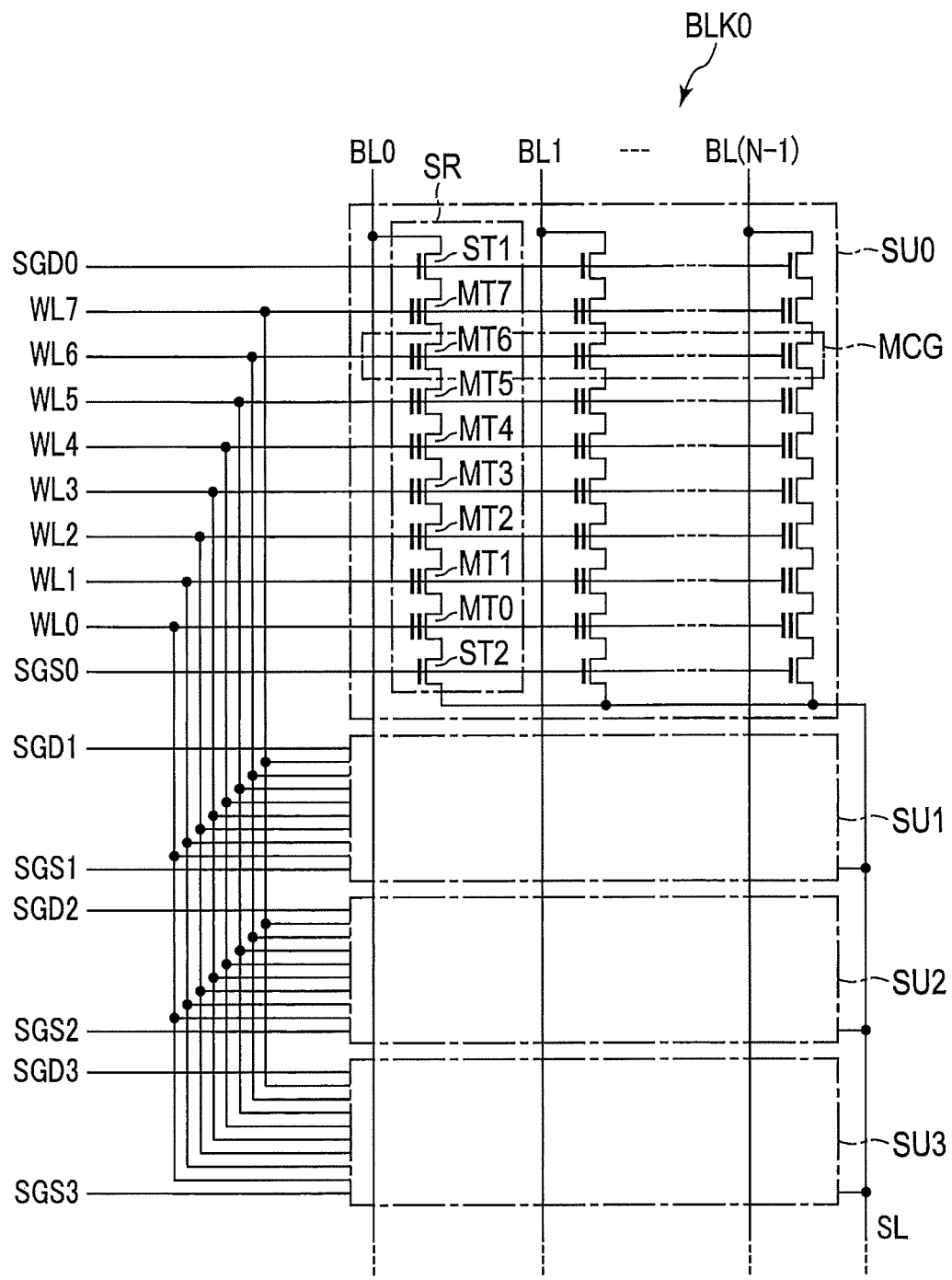
FIG. 3 is a circuit diagram of a memory cell array in the memory included in the memory system according to the first embodiment.

As shown in FIG. 3, the block BLK0 includes, for example, four string units SU (SU0 to SU3). Each of the string units SU includes a plurality of NAND strings SR. Each of the NAND strings SR includes, for example, eight memory cell transistors MT0 to MT7, and select transistors ST1 and ST2. Hereinafter, the memory cell transistors MT0 to MT7 will be referred to as memory cell transistors MT, unless specified. Each memory cell transistor MT includes a control gate and a charge storage layer, and holds data in a non-volatile manner.

The memory cell transistor MT may be of a MONOS type that uses an insulation film for the charge storage layer, or may be of an FG type that uses a conductive layer for the charge storage layer. The number of the memory cell transistors MT is not limited to a particular number, and may be 16, 32, 64, 96, 128, etc., as well as eight. Moreover, the number of each of the select transistors ST1 and ST2 may be freely selected, and it is only required that there are at least one of each.

The memory cell transistors MT are coupled in series between the source of the select transistor ST1 and the drain of the select transistor ST2. More specifically, the current paths of the memory cell transistors MT0 to MT7 are coupled in series. The drain of the memory cell transistor MT7 is coupled to the source of the select transistor ST1, and the source of the memory cell transistor MT0 is coupled to the drain of the select transistor ST2.

The gates of the select transistors ST1 in the string units SU0 to SU3 are respectively coupled to select gate lines SGD0 to SGD3. Similarly, the gates of the select transistors ST2 in the string units SU0 to SU3 are respectively coupled to the select gate lines SGS0 to SGS3. Hereinafter, the select gate lines SGD0 to SGD3 will be referred to as select gate lines SGD, unless specified. The select gate lines SGS0 to SGS3 will be referred to as select gate line SGS, unless specified. The select gate lines SGS0 to SGS3 of the string units SU may be coupled in common.

The control gates of the memory cell transistors MT0 to MT7 in each block BLK are respectively coupled to the word lines WL0 to WL7 in common. Hereinafter, the word lines WL0 to WL7 will be referred to as word lines WL, unless specified.

The drains of the select transistors ST1 of the NAND strings SR in each string unit SU are coupled to different bit lines BL0 to BL(N−1) (where N is an integer of 2 or greater). Hereinafter, the bit lines BL0 to BL(N−1) will be referred to as bit lines BL, unless specified. The NAND strings SR in the respective string units SU of a plurality of blocks BLK are coupled in common to one of the bit lines BL. Moreover, the sources of the select transistors ST2 are coupled in common to the source line SL. In other words, each string unit SU is a set of NAND strings SR coupled to different bit lines BL and coupled to the same select gate lines SGD and SGS. Each block BLK is a set of string units SU that share the same word lines WL. The memory cell array 18 is a set of blocks BLK that share the same bit lines BL.

A data write operation and a data read operation are performed at once on the memory cell transistors MT coupled to one of the word lines WL in one of the string units SU. Hereinafter, a group of memory cell transistors MT selected at once in a data write operation and a data read operation will be referred to as "memory cell group MCG". A collection of one-bit data items of each memory cell transistor MT written into or read from one memory cell group MCG will be referred to as a "page".

When the memory 100 is a NAND-type flash memory, the memory cell transistors MT may assume two or more states of different threshold voltages, namely, the memory 100 may be configured in such a manner that one memory cell transistor MT stores multiple values (multiple bits). In the case of such a memory cell transistor MT capable of storing multiple values, a plurality of pages are assigned to one word line WL.

A data erase operation may be performed at once in units of blocks BLK.

For example, in the memory cell array 18 with the above-described configuration, one of the blocks BLK or one of the string units SU may be assigned to the management area 120.

1.2. Flow of Memory Sanitization

Figure 4:
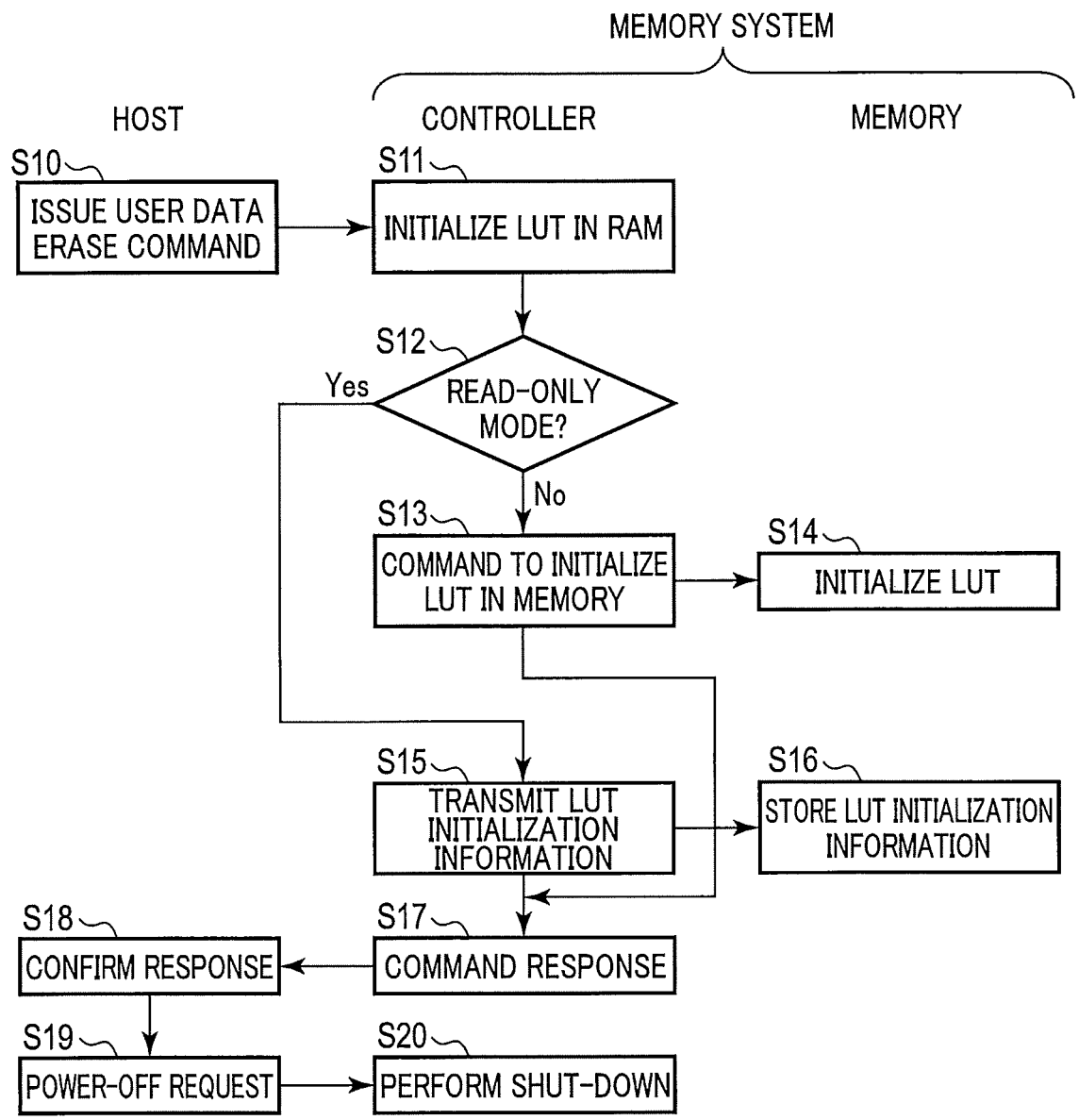
FIG. 4 shows a startup operation of the memory system according to the first embodiment.
Figure 5:
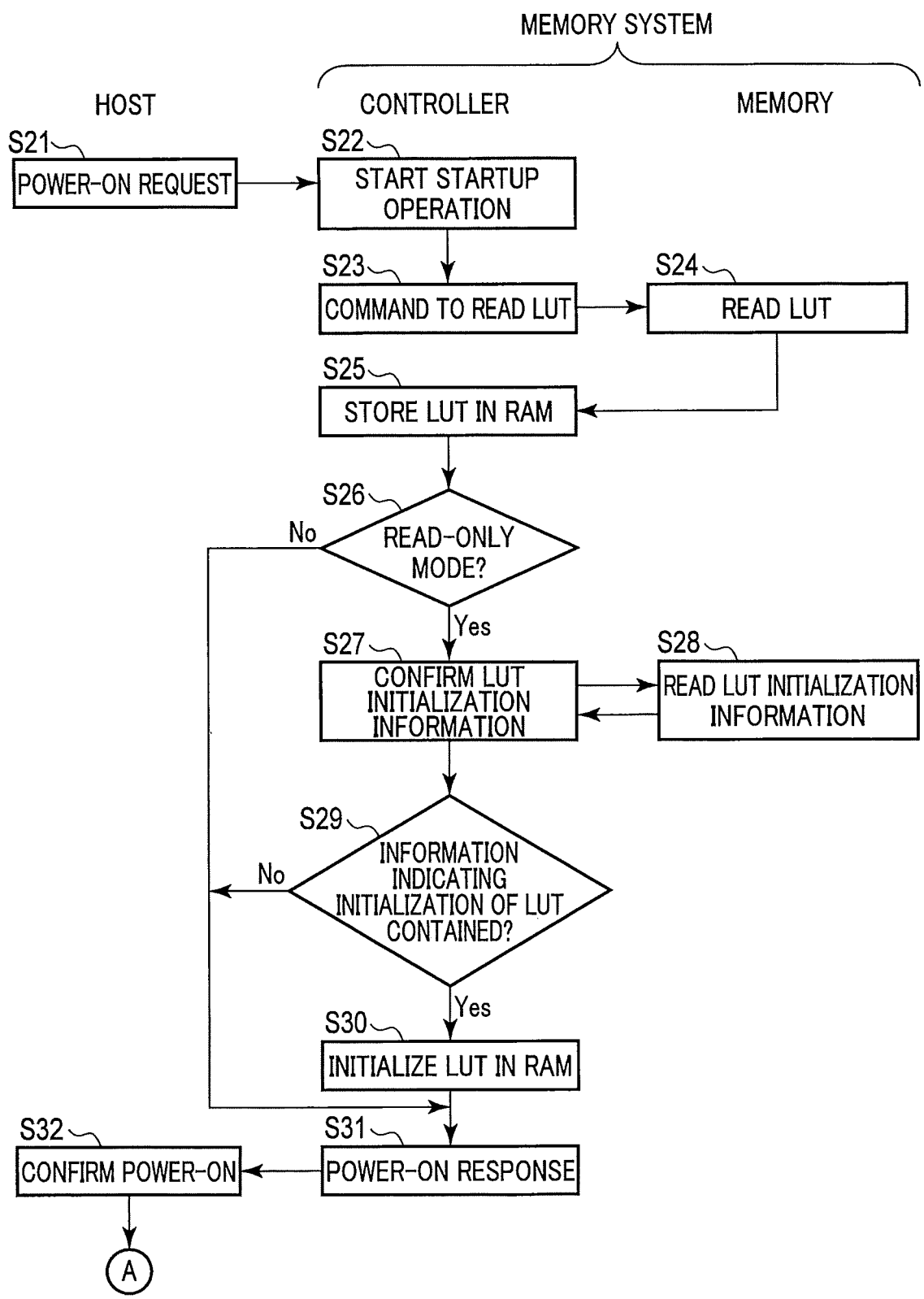
FIG. 5 shows a startup operation of the memory system according to the first embodiment.
Figure 6:
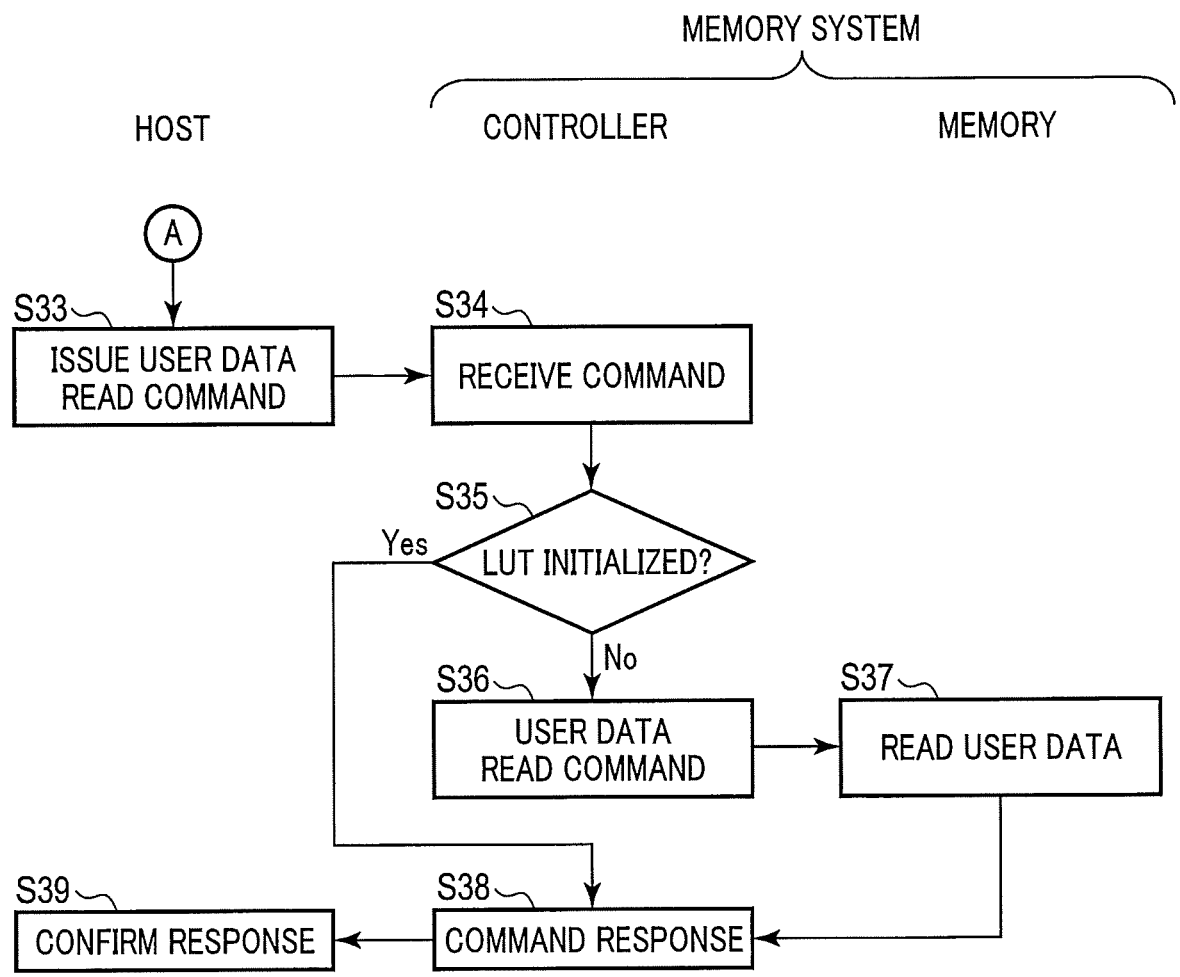
FIG. 6 shows a startup operation of the memory system according to the first embodiment.

Next, the access of the host apparatus 2 and the memory system 1 at the time of sanitization of the memory 100 will be explained with reference to FIGS. 4 to 6. FIG. 4 is a flowchart showing steps until the memory system 1 is shut down, and FIGS. 5 and 6 are flowcharts showing steps at the time of starting up the memory system 1.

As shown in FIG. 4, the host apparatus 2 issues an erase command of user data (e.g., a command to initialize the memory 100), and transmits the erase command to the controller 200 (step S10).

Upon receiving the command from the host apparatus 2, the CPU 230 performs logical erasure, and initializes the second lookup table LUT stored in the RAM 220 (step S11). That is, the entire logical-to-physical address conversion data in the second lookup table LUT is erased.

Next, when the memory 100 is not in a read-only mode (step S12_No), namely, when the memory 100 is in a normal operation mode that does not restrict a write operation or an erase operation, the CPU 230 issues a command to initialize the first lookup table LUT stored in the LUT area 121 of the memory 100, and transmits the command to the memory 100 via the memory interface circuit 250 (step S13).

Upon receiving the command, the memory 100 performs an erase operation, and initializes the first lookup table LUT in the LUT area 121 (step S14).

On the other hand, when the memory 100 is in a read-only mode (step S12_Yes), the CPU 230 transmits LUT initialization information to the memory 100 (step S15).

The memory 100 stores the LUT initialization information in the LUT initialization information area 122 (step S16).

After the logical erasure is completed, the CPU 230 transmits a response (hereinafter referred to as "command response") to erase command of the user data to the host apparatus 2, to inform the host apparatus 2 that the logical erasure has been properly completed (step S17).

After confirming the command response (step S18), the host apparatus 2 transmits a power-off request to the controller 200 (step S19).

The CPU 230 performs a shut-down operation in accordance with a power-off request (step S20).

Next, a startup operation of the memory system 1 will be explained.

As shown in FIG. 5, the host apparatus 2 transmits a power-on request to the controller 200 (step S21).

In accordance with the power-on request, the CPU 230 starts a startup operation (step S22).

The CPU 230 issues a command to read the first lookup table LUT from the memory 100, and transmits the command to the memory 100 (step S23).

Upon receiving the command, the memory 100 reads the first lookup table LUT from the LUT area 121, and transmits the first lookup table LUT to the controller 200 (step S24).

The CPU 230 stores the first lookup table LUT read from the memory 100 as the second lookup table LUT in the RAM 220 (step S25).

When the memory 100 is in a read-only mode (step S26_Yes), the CPU 230 confirms the LUT initialization information (step S27), and confirms whether or not the second lookup table LUT stored in the RAM 220 needs to be initialized. More specifically, the CPU 230 issues a command to read LUT initialization information from the memory 100, and transmits the command to the memory 100. The memory 100 reads the LUT initialization information from the LUT initialization information area 122 based on the command, and transmits the LUT initialization information to the controller 200 (step S28).

When the LUT initialization information contains information indicating that the second lookup table LUT has been initialized (step S29_Yes), the CPU 230 initializes the second lookup table LUT stored in the RAM 220 (step S30).

When the memory 100 is not in a read-only mode in step S26 (step S26_No), when the LUT initialization information does not contain information indicating that the second lookup table LUT has been initialized in step S29 (step S29_No), or after initialization of the second lookup table LUT is completed in step S30, the CPU 230 transmits, to the host apparatus 2, a response to the power-on request (hereinafter referred to as "power-on response") (step S31).

The host apparatus 2 confirms the power-on response, and confirms that the startup operation has been properly completed (step S32).

As shown in FIG. 6, after confirming the completion of the startup operation, the host apparatus 2 issues a user data read command to confirm that the user data has been erased, and transmits the read command to the controller 200 (step S33).

Upon receiving the command (step S34), the CPU 230 refers to the second lookup table LUT in the RAM 220, and confirms whether or not the second lookup table LUT has been initialized (step S35).

When the second lookup table LUT in the RAM 220 has not been initialized (step S35_No), the CPU 230 issues a user data read command, and transmits the read command to the memory 100 (step S36).

Upon reading the user data from the user area 110 in accordance with the command, the memory 100 transmits the user data to the controller 200 (step S37). The CPU 230 stores the read data received from the memory 100 into the buffer memory 240.

When the second lookup table LUT in the RAM 220 has been initialized (step S35_Yes), the CPU 230 does not perform a read operation in the memory 100, since there is no physical address corresponding to the logical address.

The CPU 230 transmits, to the host apparatus 2, a command response to the read command (step S38). More specifically, when the second lookup table LUT in the RAM 220 has not been initialized, the CPU 230 transmits, to the host apparatus 2, the user data read from the memory 100. On the other hand, when the second lookup table LUT in the RAM 220 has been initialized, the CPU 230 transmits, to the host apparatus 2, a data value indicating an erased state or an initialized state of the second lookup table LUT as a proper response to the command.

The host apparatus 2 confirms the command response received in step S38. More specifically, when a data value indicating an erased state or an initialized state is received as the command response, the host apparatus 2 determines that the state in which the user data in the memory 100 has been erased is maintained, namely, sanitization is properly completed.

1.3 Advantageous Effect of Present Embodiment

With the configuration of the present embodiment, it is possible to erase data in a memory even in a read-only mode. This advantageous effect will be explained in detail below.

In a read-only mode, the size of data that can be non-volatilized in the memory 100 is restricted. Accordingly, when the host apparatus 2 issues a user data erase command, the controller 200 performs logical erasure and initializes the second lookup table LUT in the RAM 220; however, the first lookup table LUT that contains pre-initialization information remains in the memory 100. When the memory system 1 is powered on or off thereafter, namely, when power cycling is repeated, the second lookup table LUT initialization information is lost, since the RAM 220 is a volatile memory, and only the first lookup table LUT containing the pre-initialization information in the memory 100 remains. When the host apparatus 2 executes a user data read command in this state, the controller 200 obtains information from the pre-initialization first lookup table LUT, and thus performs an operation different from as expected. That is, the memory 100 returns to the state in which the user data is not erased.

On the other hand, with the configuration of the present embodiment, it is possible for the memory system 1 to store the LUT initialization information in the memory 100 in the read-only mode. In the startup operation, the memory system 1 can initialize the first lookup table LUT read from the memory 100, based on the LUT initialization information. Accordingly, by initializing the first lookup table LUT at the time of the startup operation, the host apparatus 2 recognizes that the user data erased state is maintained in the memory system 1.

Furthermore, since the user data erased state can be maintained, it is possible to prevent the user data from being leaked.

2. Second Embodiment

Next, the second embodiment will be described. In the second embodiment, a flow of sanitization of a memory 100 different from that of the first embodiment will be explained. Hereinafter, the explanation will focus mainly on the matters different from the first embodiment

2.1. Flow of Memory Sanitization

Figure 7:
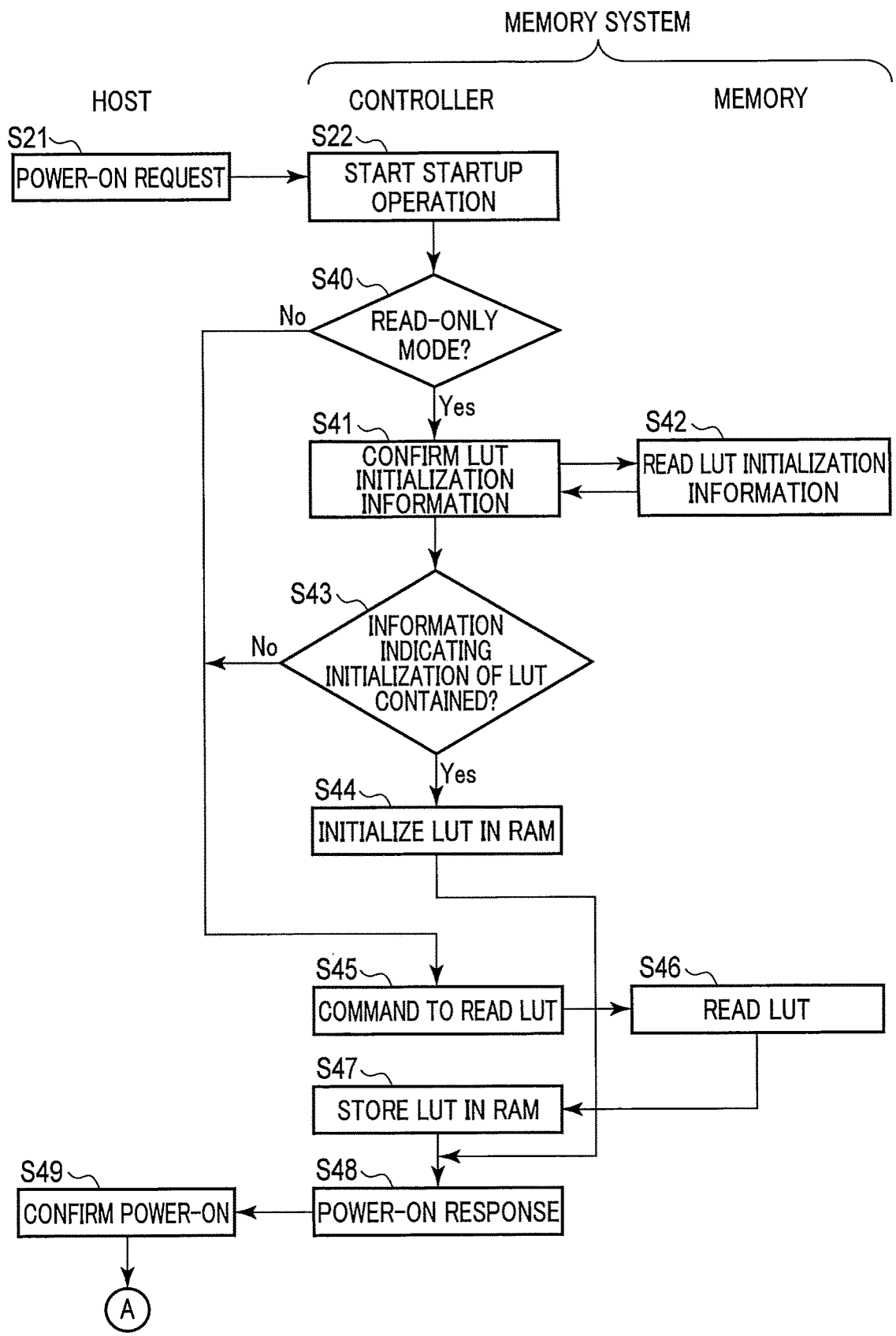
FIG. 7 shows a startup operation of a memory system according to a second embodiment.

The access of the host apparatus 2 and the memory system 1 at the time of sanitization of the memory 100 will be explained with reference to FIG. 7. FIG. 7 is a flowchart showing some of the steps until the memory system 1 is booted up. The steps until the memory system 1 of the present embodiment is shut down are the same as those in FIG. 4 of the first embodiment, and the steps of booting up the memory system 1 that are not shown in FIG. 7 are the same as those of FIG. 6 of the first embodiment.

As shown in FIG. 7, the host apparatus 2 transmits a power-on request to the controller 200 (step S21), as in FIG. 5 of the first embodiment. In accordance with the power-on request, the CPU 230 performs a startup operation (step S22).

When the memory 100 is in a read-only mode (step S40_Yes), the CPU 230 reads LUT initialization information from the memory 100 (step S42), and confirms the LUT initialization information (step S41).

When the LUT initialization information contains information indicating that the second lookup table LUT has been initialized (step S43_Yes), the CPU 230 initializes the second lookup table LUT in the RAM 220, instead of reading the first lookup table LUT from the memory 100 (step S44).

When the memory 100 is not in a read-only mode in step S40 (step S40_No), or when the LUT initialization information does not contain information indicating that the second lookup table LUT has been initialized in step S43 (step S43_No), the CPU 230 issues a command to read the first lookup table LUT, and transmits the command to the memory 100 (step S45).

Upon receiving the command, the memory 100 reads the first lookup table LUT, and transmits the first lookup table LUT to the controller 200 (step S46).

The CPU 230 stores the first lookup table LUT read from the memory 100 as the second lookup table LUT in the RAM 220 (step S47).

After step S44 or step S47 is completed, the CPU 230 transmits a power-on response to the host apparatus 2 (step S48).

The host apparatus 2 confirms the power-on response (step S49), and confirms that the startup operation has been properly completed.

The operations of step S48 and thereafter are the same as those of step S33 and thereafter in FIG. 6 of the first embodiment.

2.2 Advantageous Effects of Present Embodiment

The configuration of the present embodiment achieves advantageous effects similar to those achieved by the first embodiment.

3. Third Embodiment

Next, the third embodiment will be described. In the third embodiment, the configuration of the memory system 1 different from the first embodiment will be explained. Hereinafter, the explanation will focus mainly on the matters different from the first embodiment.

3.1. Overall Configuration of Memory System

First, the overall configuration of the memory system according to the present embodiment will be described with reference to FIG. 8.

As shown in FIG. 8, the memory system 1 includes non-volatile memories 100 and 101 and a controller 200.

The memory 100 roughly includes, as a spatial area of the memory, a user area 110 and a management area 120, and the management area 120 includes a LUT area 121.

The memory 101 is used as a part of the management area 120, and includes a LUT initialization information area 122 as a spatial area of the memory. Of the management area, the memory 101 is only required to store information of a relatively small size, and an Electrically Erasable Programmable Read-Only Memory (EEPROM), for example, may be used as the memory 101.

3.2 Advantageous Effects of Present Embodiment

With the configuration of the present embodiment, it is possible to obtain an advantageous effect similar to that of the first embodiment.

The second embodiment may be applied to the third embodiment.

4. Modifications, Etc.

The memory system according to the above-described embodiments includes: a non-volatile memory (100) including a first area (110) configured to hold first data (user data) received from an outside and a second area (120) configured to hold second data (LUT initialization information); a volatile memory (220); and a controller (230) configured to control the non-volatile memory and the volatile memory. The non-volatile memory holds third data (first LUT) that associates a first address (logical address) of the first data assigned to an instruction received from an outside with a second address of the first data (physical address) that specifies a part of the first area. As a startup operation, the controller reads the third data from the non-volatile memory and holds the third data as fourth data (second LUT) in the volatile memory. The controller erases the fourth data from the volatile memory when the second data is held in the second area.

By applying the above-described embodiments, it is possible to provide a memory system capable of erasing data from a memory even in a state in which a write operation and an erase operation are restricted, and to maintain an erased state regardless of power cycling.

The embodiments are not limited to the above-described embodiments, and various modifications can be made.

The term "couple" in the above-described embodiments includes indirect coupling via a transistor, a resistor or the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory including a first area configured to hold first data received from an outside and a second area configured to hold second data;
a volatile memory; and
a controller configured to control the non-volatile memory and the volatile memory,
wherein the non-volatile memory holds third data that associates a first address of the first data with a second address of the first data, the first address being assigned to an instruction received from an outside, the second address specifying a part of the first area,
as a startup operation, the controller reads the third data from the non-volatile memory and holds the third data as fourth data in the volatile memory, and
the controller erases the fourth data from the volatile memory when the second data is held in the second area.

2. The system according to claim 1, wherein
when receiving an erase instruction from an outside, the controller erases the fourth data from the volatile memory, and instructs the non-volatile memory to write the second data into the second area.

3. The system according to claim 2, wherein
the non-volatile memory includes a first mode and a second mode, the first mode restricting a write operation and an erase operation, the second mode restricting neither the write operation nor the erase operation,
in the first mode, the controller instructs the non-volatile memory to write the second data, and
in the second mode, the controller instructs the non-volatile memory to erase the third data held in the non-volatile memory.

4. The system according to claim 1, wherein
the second area includes a third area that holds the second data, and a fourth area that holds the third data.

5. The system according to claim 1, wherein
the non-volatile memory is a NAND-type flash memory.

6. The system according to claim 1, wherein
the second data is information indicating that the fourth data has been erased.

7. The system according to claim 1, wherein
when the fourth data is held in the volatile memory after the startup operation, the controller reads the first data from the non-volatile memory based on a read instruction of the first data, and
when the fourth data is not held in the volatile memory after the startup operation, the controller does not perform a read operation in the non-volatile memory.

8. The system according to claim 1, wherein
when the second data is held in the second area in the startup operation, the controller erases the fourth data from the volatile memory, instead of reading the third data from the non-volatile memory, and
when the second data is not held in the second area in the startup operation, the controller reads the third data from the non-volatile memory and holds the third data as the fourth data in the volatile memory.

9. A memory system comprising:
a first non-volatile memory including a first area configured to hold first data received from an outside;
a second non-volatile memory including a second area configured to hold second data;
a volatile memory; and
a controller configured to control the first and second non-volatile memories and the volatile memory,
wherein the non-volatile memory holds third data that associates a first address of the first data with a second address of the first data, the first address being assigned to an instruction received from an outside, the second address specifying a part of the first area,
as a startup operation, the controller reads the third data from the second non-volatile memory and holds the third data as fourth data in the volatile memory, and
the controller erases the fourth data from the volatile memory when the second data is held in the second area.

* * * * *